United States Patent [19]

Chen

[11] Patent Number: 5,020,851
[45] Date of Patent: Jun. 4, 1991

[54] SADDLE SUPPORT DEVICE FOR A BICYCLE

[76] Inventor: King P. Chen, No. 198, Feng Chou Rd., Shen Kang Hsiang, Taichung Hsien, Taiwan

[21] Appl. No.: 579,308

[22] Filed: Sep. 7, 1990

[51] Int. Cl.⁵ .............................................. B62J 1/00
[52] U.S. Cl. .................................... 297/195; 297/215
[58] Field of Search ................ 297/195, 215; 403/391

[56] References Cited

U.S. PATENT DOCUMENTS

| 460,279 | 9/1891 | McGlinchey | 297/215 X |
| 1,114,648 | 10/1914 | Pursglove | 297/215 X |
| 3,891,333 | 6/1975 | Corderac'k | 297/195 X |
| 3,992,054 | 11/1976 | Campagnolo | 297/195 |
| 4,502,811 | 3/1985 | Patriarca | 297/195 X |
| 4,568,121 | 2/1986 | Kashima | 297/195 |
| 4,783,119 | 11/1988 | Moses | 297/195 |

Primary Examiner—Peter A. Aschenbrenner
Attorney, Agent, or Firm—Dellett, Smith-Hill and Bedell

[57] ABSTRACT

A saddle support device includes a resilient support fixed on an upper end of a seat post of a bicycle. A base, a carriage and a yoke are provided in series on the support and each has a hole and are clamped together by a bolt. A pair of saddle frames of a saddle are received between the carriage and the yoke. A cushion is received in the support. The resilient support and the cushion absorb a shock or a vibration which may be transferred to a rider so that the rider may feel more comfortable.

2 Claims, 3 Drawing Sheets

SADDLE SUPPORT DEVICE FOR A BICYCLE

BACKGROUND OF THE INVENTION

The present invention relates to a saddle support device, and more particularly to a saddle support device for a bicycle and a similar vehicle.

A saddle support device generally comprises a support member integrally fixed on an upper end of a seat post. A carriage and a yoke are supported on the upper end of the support member for receiving a pair of saddle frames of the saddle of the bicycle. Two examples of such a saddle support device are disclosed in U.S. Pat. No. 4,275,922 to Juy, and U.S. Pat. No. 4,421,357 to Shimano. The structures of the saddle support devices of these patents are solid and are not resilient so that they can not absorb shock, vibration or the like which may be transferred to the riders.

The present invention has arisen to mitigate and/or obviate the afore-described disadvantages of the conventional saddle support devices.

SUMMARY OF THE INVENTION

The objective of the present invention is to provide a saddle support device for a bicycle which has a resilient structure for absorbing shock, vibration or the like which may be transferred to the riders.

In accordance with one aspect of the invention, there is provided a saddle support device which includes a support member integrally fixed on an upper end of a seat post of a bicycle. The support member is C-shaped with an open rear end so as to provide a resilient structure. A rib is formed in an upper surface of the support member, and an opening is formed in the rib. A base, a carriage and a yoke are provided in series on the support member and each has a hole formed therein. A slot is formed in a lower surface of the base for engagement with the rib of the support member. A pair of saddle frames of a saddle are received between the carriage and the yoke when the carraige and the yoke are coupled together. A bolt extends through the opening of the support member and the holes of the base, the carriage and the yoke. A block is threadedly engaged to an upper end of the bolt so that the base, the carriage and the yoke are clamped together by the bolt and the block. The resilient structure of the support member is provided for absorbing a shock or a vibration which may be transferred to a rider so that the rider may feel more comfortable.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
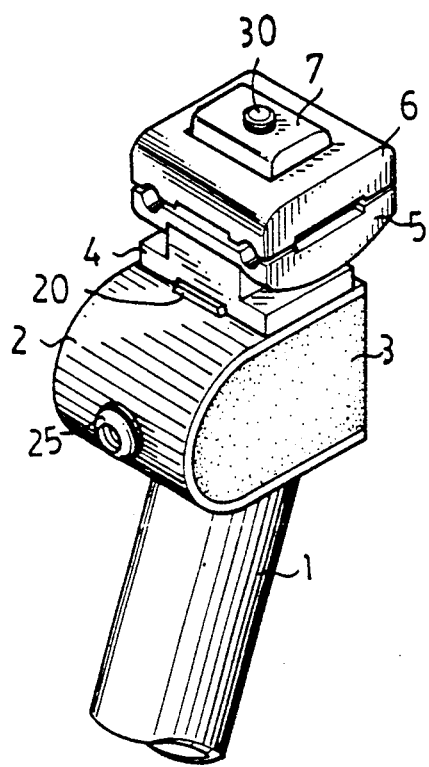
FIG. 1 is a perspective view of a saddle support device in accordance with the present invention.
Figure 2:
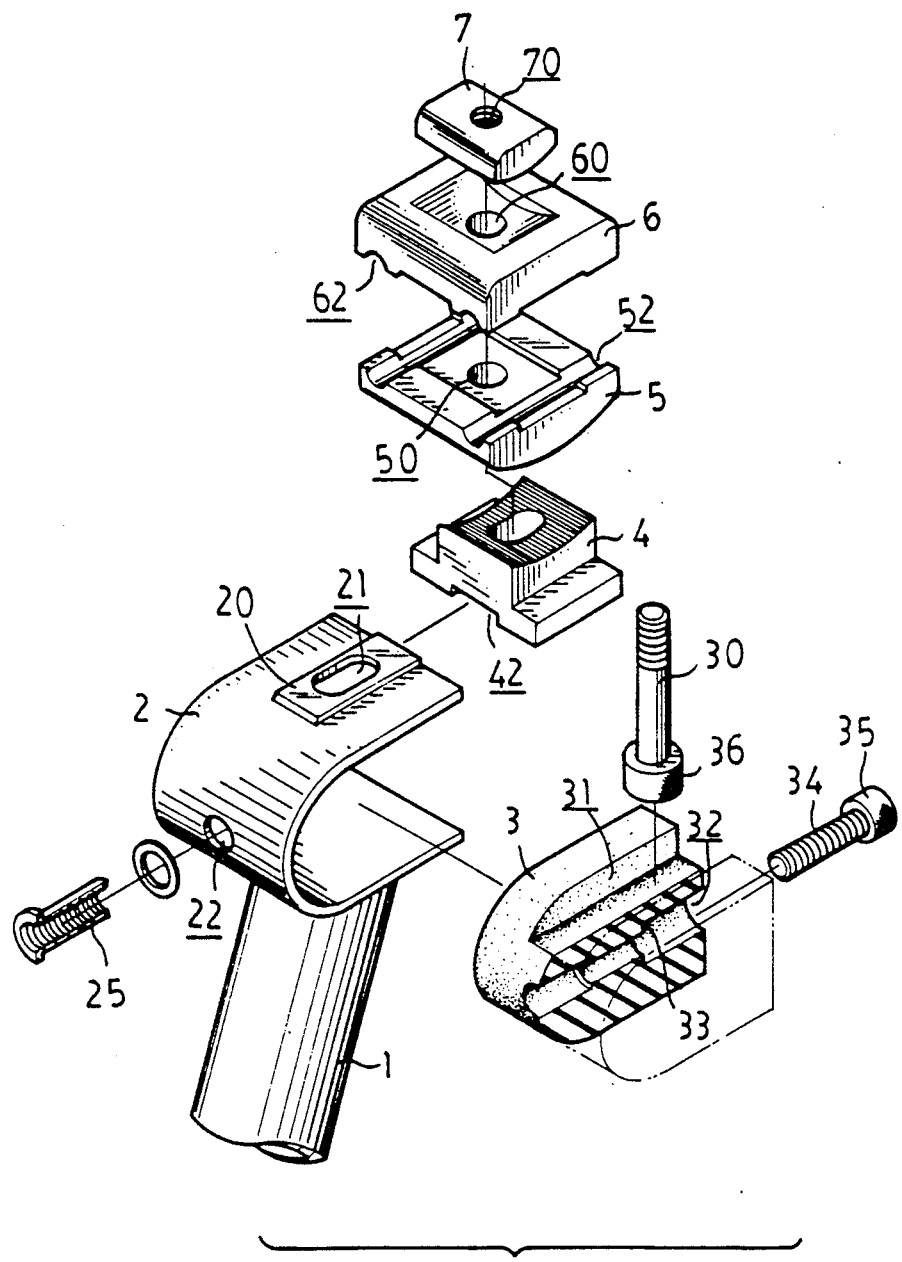
FIG. 2 is an exploded view of the saddle support device.

Referring to the drawings and initially to FIGS. 1 and 2, the saddle support device in accordance with the present invention comprises generally a support member 2 integrally fixed on an upper end of a seat post 1 of a bicycle or like vehicle, a base 4, a carriage 5 and a yoke 6 provided in series upon the support member 2, and a cushioning element 3 disposed in the base 4.

The support member 2 is substantially C-shaped with an open rear end so that the support member 2 forms a resilient structure. A rib 20 is formed in an upper surface of an upper blade of the support member 2 and has an opening 21 formed therein. A hole 22 is formed in the front end of the support member 2. The front end of the support member 2 is also referred to the front end of the bicycle. A lower blade of the support member 2 is integrally fixed on the upper end of the seat post 1.

The base 4, the carriage 5 and the yoke 6 each has a hole 40, 50, 60 formed therein. A slot 42 is formed in the lower surface of the base 4 for receiving and engagement with the rib 20 of the support member 2 so that the base 4 is guided to move longitudinally along the support member 2. The upper surface of the base 4 is slightly concave. A pair of grooves 52 are formed in an upper surface of the carriage 5, and a pair of grooves 62 are formed in a lower surface of the yoke 6. A pair of saddle frames 80 of the saddle 8 (FIG. 3) are received in the grooves 52, 62 when the carriage 5 and the yoke 6 are coupled together. Alternatively, without the base 4, the lower surface of the carriage 5 can be directly engaged with the upper blade of the support member 2.

Figure 3:
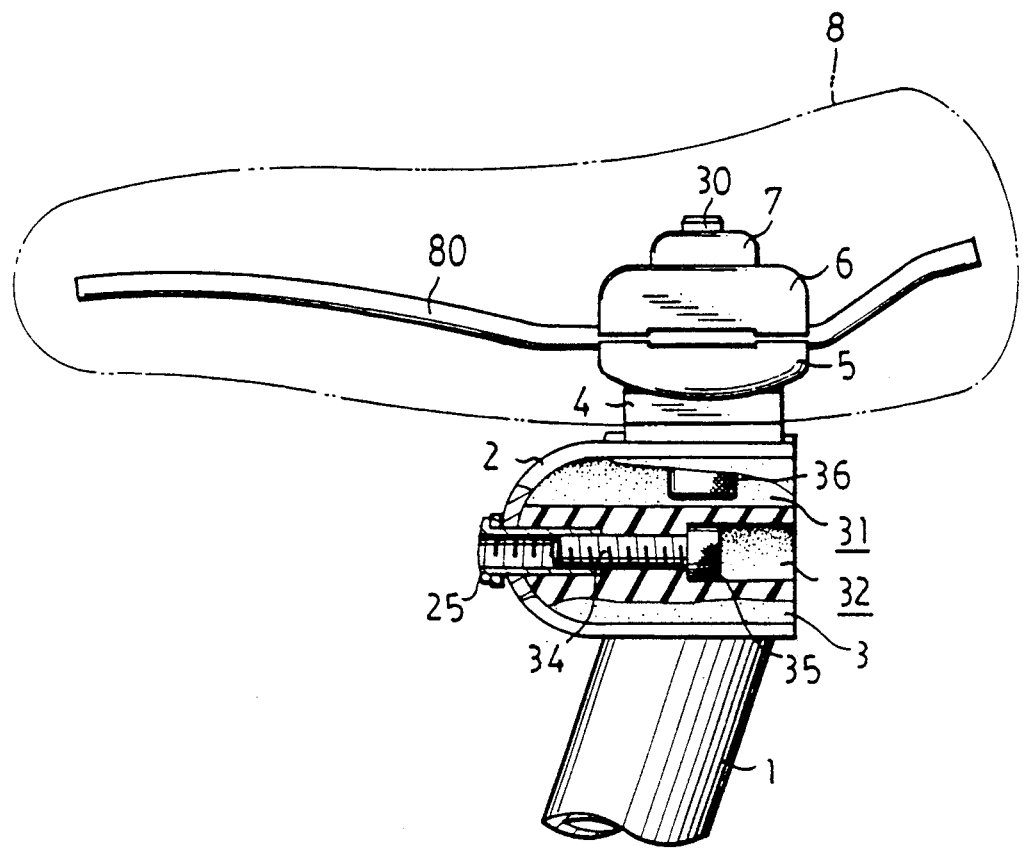
FIG. 3 is a cross sectional view of the saddle support device.

The cushioning element 3 is made of resilient materials, such as sponge material, rubber, foamable material etc. A channel 31 is formed in an upper end of the cushioning element 3, and an aperture 32 is formed in the center of the cushioning element 3. A shoulder 33 is formed in the aperture 32. The cushioning element 3 is received in the support member 2 and is fixed in position by a bolt 34 and a sleeve nut 25, in which the sleeve nut 25 passes through the hole 22 of the support member 2 and the head 35 of the bolt 34 is enagaed with the shoulder 33 so that the cushioning element 3 can be retained in place. A bolt 30 extends through the opening 21 of the support member 2 and the holes 40, 50, 60 of the base 4, the carriage 5 and the yoke 6 respectively. A block 7 which has a screw hole 70 formed therein is threadedly engaged onto the upper end of the bolt 30 so that the base 4, the carriage 5 and the yoke 6 can be clamped in place by the bolt 30. As is best shown in FIG. 3, the head 36 of the bolt 30 is received in the channel 31 of the cushioning element 3.

Accordingly, the saddle support device in accordance with the present invention has a resilient support member 2 which is capable of absorbing shock, vibration or the like which may be transferred to the rider during riding so that the rider may feel comfortable. Furthermore, the cushioning element 3 which is made of resilient materials further absorbs the shock, the vibration or the like so that the rider may feel more comfortable. In addition, the cushioning element 3 which is received in the support member 2 has an adavantage to support the support member 2 and to protect the support member 2 from permanent deformation.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A saddle support device comprising a support member integrally fixed on an upper end of a seat post of a bicycle, said support member being substantially C-shaped with an open rear end so as to provide a resilient structure, a lower blade of said support member being integrally fixed on said seat post, a rib being formed in an upper surface of an upper blade of said support member, an opening being formed in said rib; a base, a carriage and a yoke being provided in series upon said support member and each having a hole formed therein, a slot being formed in a lower surface of said base for engagement with said rib of said support member so that said base is guided to move longitudinally along said support member, a pair of first grooves being formed in an upper surface of said carriage and a pair of second grooves being formed in a lower surface of said yoke, a pair of saddle frames of a saddle being received in said first grooves and said second grooves when said carriage and said yoke are coupled together; a bolt extending through said opening of said support member and said holes of said base, said carriage and said yoke, and a block being threadedly engaged to an upper end of said bolt so that said base, said carriage and said yoke are clamped together by said bolt and said block; and said resilient structure of said support member being provided for absorbing a shock or a vibration which may be transferred to a rider so that said rider may feel more comfortable.

2. A saddle support device according to claim 1, wherein a cushioning element is received in said support member, a channel is formed in an upper end of said cushioning element, a head of said bolt is received in said channel of said cushioning element, a second hole is formed in a front end of said support member, an aperture is formed in a center of said cushioning element, said cushioning element is retained in place by a second bolt which extends through said aperture of said cushioning element and said second hole of said support member and is threadedly engaged with a nut so that said cushioning element further absorbs said shock or said vibration which may be transferred to said rider.

* * * * *